United States Patent [19]
Groeneweg

[11] Patent Number: 5,051,053
[45] Date of Patent: Sep. 24, 1991

[54] TILTING BED TRAILER APPARATUS WITH PERIMETER FRAME

[76] Inventor: Ronald L. Groeneweg, 232 6th Ave., Sioux Center, Iowa 51250

[21] Appl. No.: 524,660

[22] Filed: May 17, 1990

[51] Int. Cl.⁵ .............................................. B60P 1/24
[52] U.S. Cl. ...................................... 414/483; 298/38; 414/484
[58] Field of Search ............. 414/480, 482, 483, 484, 414/485; 298/23 TT, 38

[56] References Cited

U.S. PATENT DOCUMENTS

| | | | |
|---|---|---|---|
| 2,462,868 | 3/1949 | Ives | 414/484 X |
| 2,925,186 | 2/1960 | Anderson et al. | 414/483 |
| 3,415,400 | 12/1968 | Olin | 414/484 |
| 3,731,974 | 5/1973 | Stafford, Jr. | 298/38 X |
| 4,109,809 | 8/1978 | Clark . | |
| 4,139,236 | 2/1979 | Hill et al. | 414/480 X |
| 4,168,932 | 9/1979 | Clark | 414/483 |
| 4,410,207 | 10/1983 | Scharf | 414/480 X |
| 4,623,161 | 11/1986 | Sprague . | |
| 4,702,662 | 10/1987 | Marlett . | |
| 4,730,974 | 3/1988 | Andre . | |
| 4,813,841 | 3/1989 | Eischen . | |
| 4,943,202 | 7/1990 | Galloway | 414/484 X |

FOREIGN PATENT DOCUMENTS

| | | | |
|---|---|---|---|
| 972394 | 8/1975 | Canada | 414/482 |
| 249449 | 9/1987 | Fed. Rep. of Germany | 298/38 |
| 1289642 | 2/1962 | France | 414/485 |
| 1276868 | 10/1962 | France | 414/482 |
| 267546 | 6/1950 | Switzerland | 298/38 |

Primary Examiner—Robert J. Spar
Assistant Examiner—Robert S. Katz
Attorney, Agent, or Firm—Henderson & Sturm

[57] ABSTRACT

A trailer apparatus having a perimeter frame with a front, rear and intermediate portion thereof includes a trailer hitch attached to the front of the perimeter frame for permitting it to be attached to a towing vehicle. Wheels are rotatably attached to the perimeter frame and have axle-supporting structures passing between the left and right side aligned wheels. The tilting bed is pivotally attached at a point above and midway between the rotational axes of the axles, in the case of a tandem wheel arrangement having two wheels on each side thereof, or immediately above the axle on a trailer having just one wheel on each side thereof. By having the tilting bed pivotally connected to a perimeter frame at this point, the perimeter frame of the trailer will not have a tendency to tip during the loading process.

9 Claims, 4 Drawing Sheets

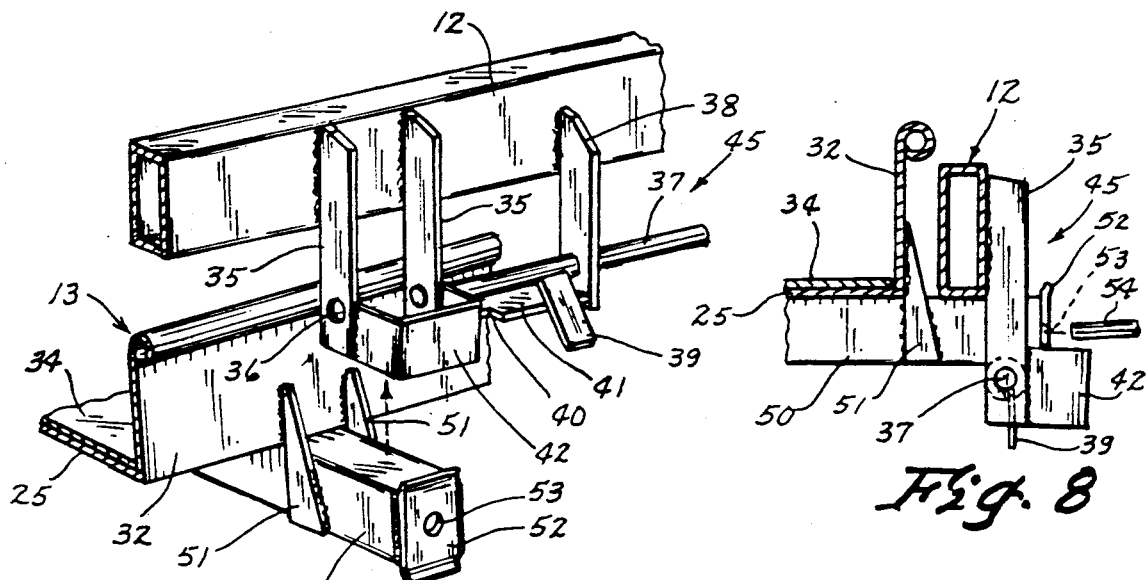
Fig. 6
Fig. 8
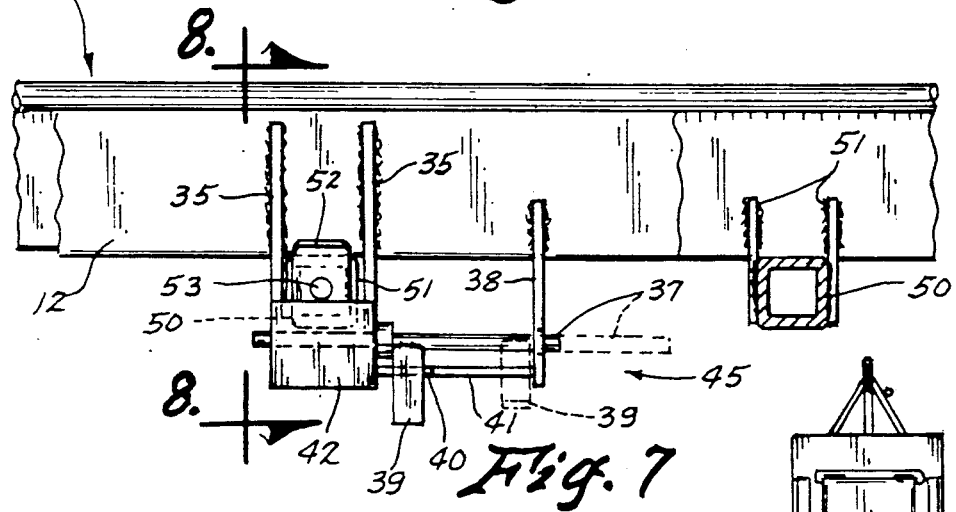
Fig. 7
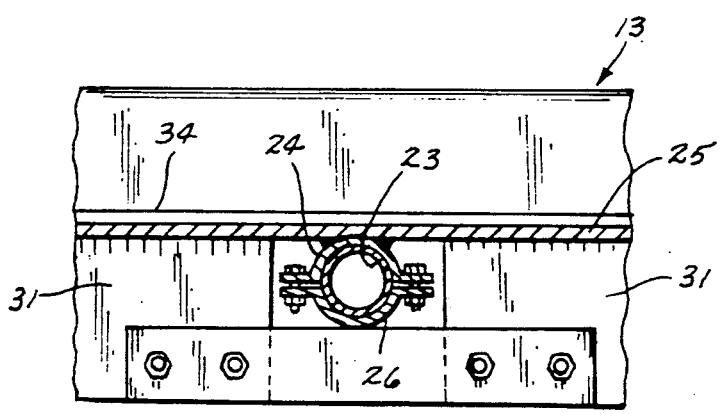
Fig. 9
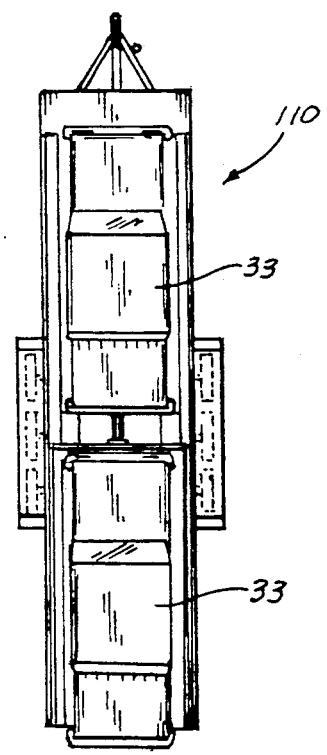
Fig. 14

TILTING BED TRAILER APPARATUS WITH PERIMETER FRAME

TECHNICAL FIELD

The present invention relates generally to a trailer having a tilting bed and more particularly to such as apparatus having a perimeter frame and an adjustable brake to prevent the tilting bed from tilting too fast during a loading and unloading process.

BACKGROUND ART

In order to load vehicles on conventional trailers, it is necessary to provide ramps or some other way to move the vehicle from the ground onto a higher level of a trailer bed. U.S. Pat. No. 4,109,809 to Clark and 4,813,841 to Eischen show tilting beds for loading snowmobiles or golf carts thereon. In both of these patents the pivot point for the tilting bed is behind the wheels of the trailer and therefore, when vehicles are loaded on trailers of this type, the front end of the trailer is going to have a strong upward force thereon due to the weight of the vehicle being loaded on the rear thereof. This creates a great danger that the hitch may pull up and off of the ball or the like to which it is attached. It also does not allow the trailer to be loaded when it is not attached to a towing vehicle. U.S. Pat. No. 4,708,662 to Marlett also has a similar shortcoming even though it purports to be for a trailer for hauling automobiles or the like.

U.S. Pat. No. 4,730,974 to Andre shows a tipping bed, but this bed pivots about an axis at the same level as the rotational axis of the wheels thereon and it appears that all of the weight-bearing portion of the bed is transmitted through this pivotal point thereby creating a major problem that this joint will need to be overdesigned to carry all of the weight required. This problem of course becomes greater the more weight or the larger vehicle that is to be transported by this trailer. Also, the axle and axle housing cannot extend across from a wheel on one side to a wheel on the other side or it would interfere with the tipping of the tilting bed.

DISCLOSURE OF THE INVENTION

The present invention relates to a trailer apparatus having a perimeter frame with a front, rear and intermediate portion thereof. A trailer hitch is attached to the front of the perimeter frame for permitting it to be attached to a towing vehicle. Wheels are rotatably attached to the perimeter frame and have axle-supporting structures passing between the left and right side aligned wheels.

The tilting bed is pivotally attached at a point above and midway between the rotational axes of the axles, in the case of a tandem wheel arrangement having two wheels on each side thereof, or immediately above the axle on a trailer having just one wheel on each side thereof. By having the tilting bed pivotally connected to a perimeter frame at this point, the perimeter frame of the trailer will not have a tendency to tip during the loading process. Only the tilting bed will tip.

An object of the present invention is to provide an improved trailer apparatus with a tilting bed for easily loading vehicles or the like onto and off from such trailer.

Another object of the present invention is to provide a trailer with a tilting bed having an adjustable brake attached thereto for preventing abrupt tipping of the tilting bed which might cause damage to the trailer or the vehicle being loaded thereon without such adjustable brake feature.

A still further object of the present invention is to provide a trailer with a tilting bed which has a perimeter frame which will not tip or tend to tip during the loading and unloading process and which, by its design, will support the tilting bed so that during the transporting phase of such trailer, all of the weight will not bear onto the joint which pivotally attaches the tilting bed to the perimeter frame.

Other objects, advantages, and novel features of the present invention will become apparent from the following detailed description of the invention when considered in conjunction with the accompanying drawings.

BRIEF DESCRIPTION OF THE DRAWINGS

FIG. 6 is a partial exploded perspective view of a mechanism for selectively locking the pivoting bed in an upward horizontal position or permitting it to be released so it can tip downwardly at the rear thereof;

FIG. 7 is a view taken along line 7—7 of FIG. 3 and showing the locking mechanism of FIG. 6 in use to hold the tilting bed in the substantially horizontal transport position and also showing in dashed lines the unlocked position thereof;

FIG. 8 is a cross sectional view taken along line 8—8 of FIG. 7;

FIG. 9 is an enlarged partial cross sectional view taken along line 9—9 of FIG. 3 and showing how the tilting bed is pivotally attached to a transverse rod which is welded at each end to the perimeter frame above and centered over the transport wheel mechanism;

FIG. 14 is a top view of an alternate form of the present invention showing two vehicles loaded on a larger six-wheel version of the present invention.

BEST MODES FOR CARRYING OUT THE INVENTION

Figure 1:
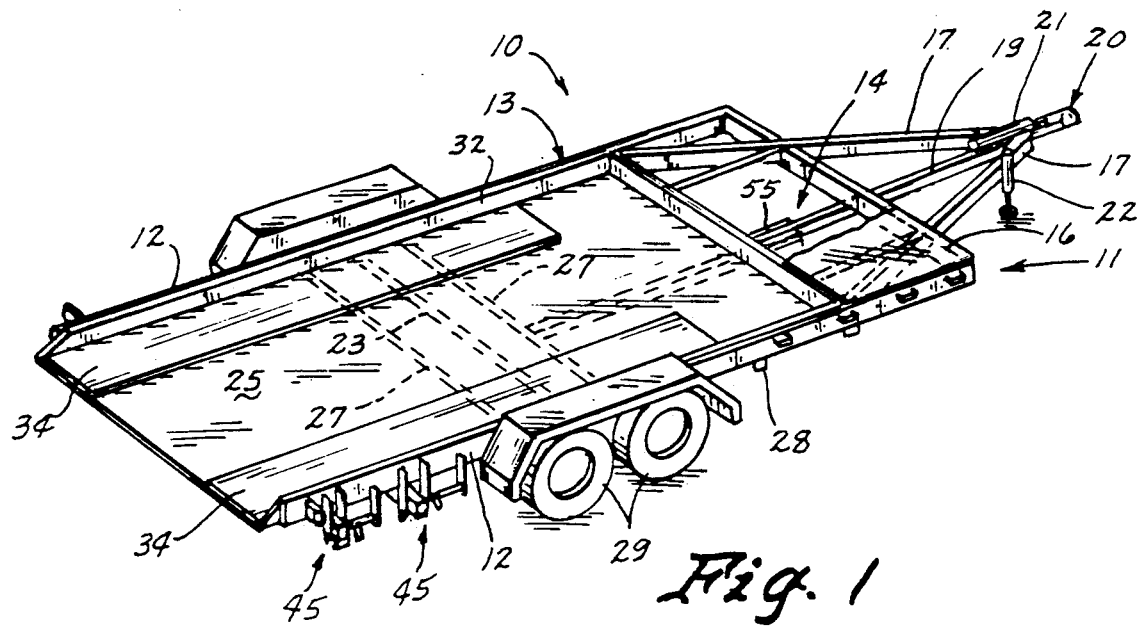
FIG. 1 is a perspective view of a trailer constructed in accordance with the present invention.

Referring now to the drawings wherein like reference numerals designate identical or corresponding parts throughout the several views, FIG. 1 shows a trailer (10) constructed in accordance with the present invention.

Figure 2:
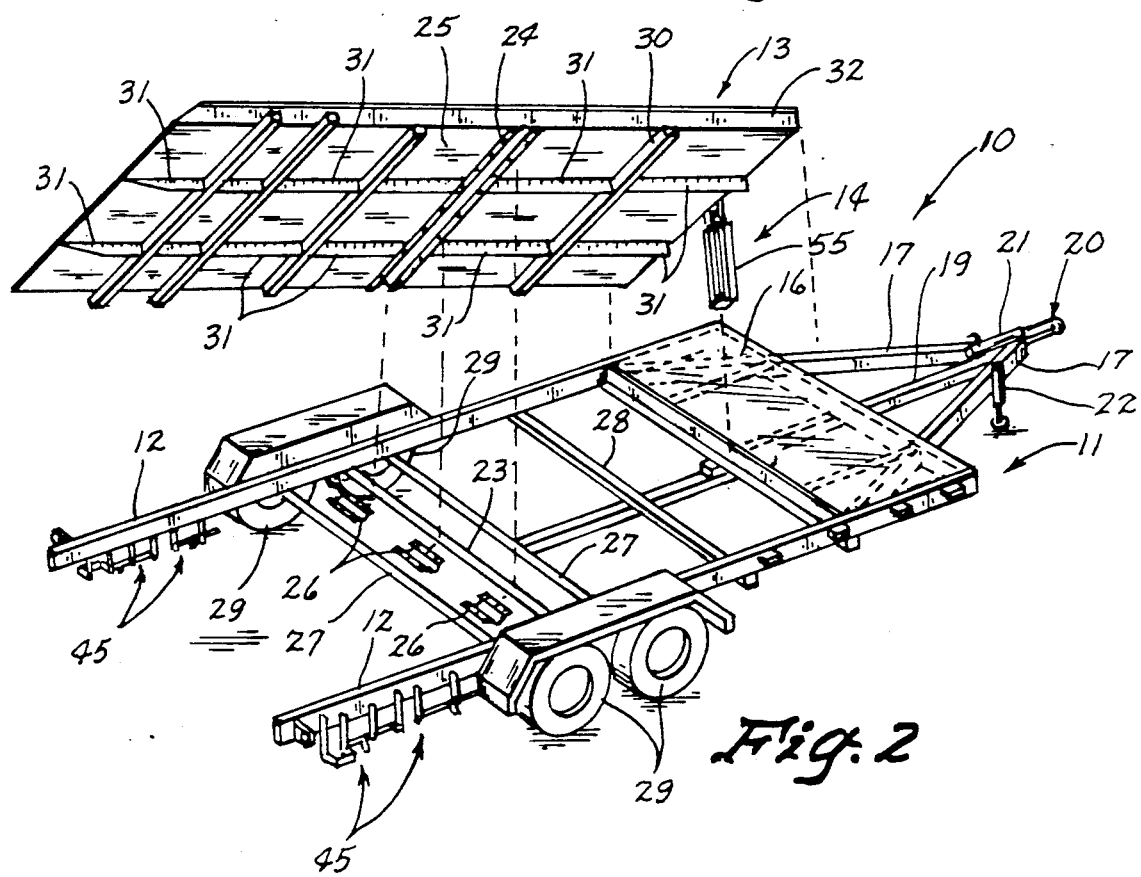
FIG. 2 is an exploded view of the trailer of FIG. 1 showing the tilting bed exploded upwardly from the perimeter frame to which it is pivotally attached.
Figure 3:
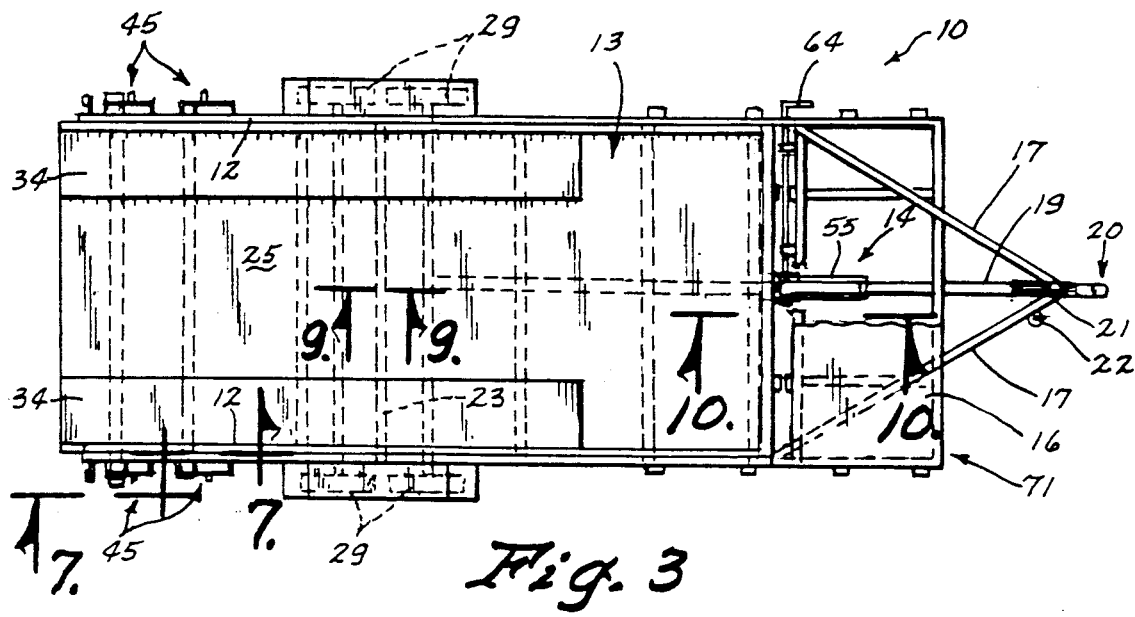
FIG. 3 is a top view of the trailer shown in FIG. 1.

Referring to FIG. 2, it is noted that a perimeter frame (11) has longitudinal members (12) thereon to which the tilting bed (13) is attached. An adjustable brake (14) is pivotally attached at the top to the tilting bed (13) and at the bottom thereof to the perimeter frame (11).

The perimeter frame (11) has a platform (16) on the front thereof which is purely optional. Also, structural members (17) and (19) lead to and are connected to a hitch structure (20) which can be of any conventional type. A hydraulic brake assist (21) activates the trailer brakes when the towing vehicle slows down quickly and is also optional. It will be understood that most trailers also have a downwardly extending adjustable leg mechanism (22) for holding the tongue portion of the trailer up off of the ground at whatever height is desired. It will be understood that the structural members (17-22) can be modified into different configurations and, in general, do not form a part of the present invention except to the extent specified in the appended claims.

A rigid rod (23) is welded to brackets which are welded at each end to the perimeter frame members (12). This aids in the structural integrity of the perimeter frame (11).

Referring to FIG. 9, it is noted that a U-shaped bracket (24) is welded to the bottom (25) of the tilting bed (13) and that clamps (26), as shown in both FIG. 2 and 9, are bolted to the bracket (24) so as to form a pivotal joint around the shaft (23). This permits the tilting bed (13) to tip between the positions shown in FIG. 4 and the position shown in FIG. 5 as will be discussed below.

Axle housings (27) are welded to the bottom of the frame members (12) of the perimeter frame (11) and have axles extending therethrough which are rotatable inside the axle housings (27) and are connected to wheels (29) so that the wheels (29) rotate with the axles inside the axle housings (27). Another brace (28) is also welded at the ends thereof to the structural members (12) on the perimeter frame (11) for supporting the front portion of the tilting bed (13) when it is in the transport position.

The tilting bed (13) has transverse cross braces (30) disposed transversely across the bottom sheet member (25) of the bed (13) and longitudinal braces (31) which extend longitudinally so that the combination of transverse braces (30) and longitudinal braces (31) give structural integrity to the tilting bed (13). An upwardly extending lip (32) extends around three of the four sides of the tilting bed (13). There is no upstanding lip on the rear of the tilting bed (13) for the obvious reason that the automobile (33), or the like shown in FIG. 4, cannot easily pass over such a lip to be loaded onto the tilting bed (13). Runners (34) are optionally provided on the sheet metal portion (25) of the tilting bed (13) to add more structural integrity to the wheel supporting portion of the tilting bed (13). It will be understood to those skilled in this art that the tilting bed (13) can also be in different configurations, including a configuration omitting the upstanding lip (32) or, alternatively, having this lip extend much higher to form a box instead of merely a platform for hauling cargo which needs to be contained by higher walls.

Another option of the present invention is to provide the user with more than one of the tilting beds (13), one for example which would be like to one shown in the drawings and another box-like tilting bed so that by merely removing the clamps (26) shown in FIGS. 2 and 9, the bed or box desired can be easily attached to the perimeter frame (11) once the bed or box not desired to be used at that time is removed.

FIG. 6 shows a pair of flanges (35) which are welded to the structural members (12) of the perimeter frame (11) and each of these flanges (35) have aligned openings (36) therein for selectively receiving a rod (37). This rod (37) is also supported on another flange (38) and this rod (37) has a locking handle (39) thereon which can fit into a slot (40) in a member (41) which is welded to the flange (38) and to the closest flange (35). A U-shaped bracket (42) is welded at each end thereof to the bottom of the flanges (35) for reasons which will be described below.

The bottom of the tilting bed (13) on the rear thereof has two transverse beams (50) thereon which are welded to the tilting bed (13) by triangular shaped brackets (51) as can best be seen in FIGS. 2 and 6. Each of the beams (50) has a locking mechanism (45) associated therewith comprised of elements (35-41) although it will be understood to those skilled in this art that only one of such locking mechanisms and only one of such beams (50) would be required.

The beam (50) has a plate (52) welded to each end thereof and each of the plates (52) has a hole (53) disposed therein. A pry bar (54) can be used in association with the locking mechanism (45) and the beam (50), as is shown in FIG. 8, as will be discussed in the operation of the device below.

Figure 11:
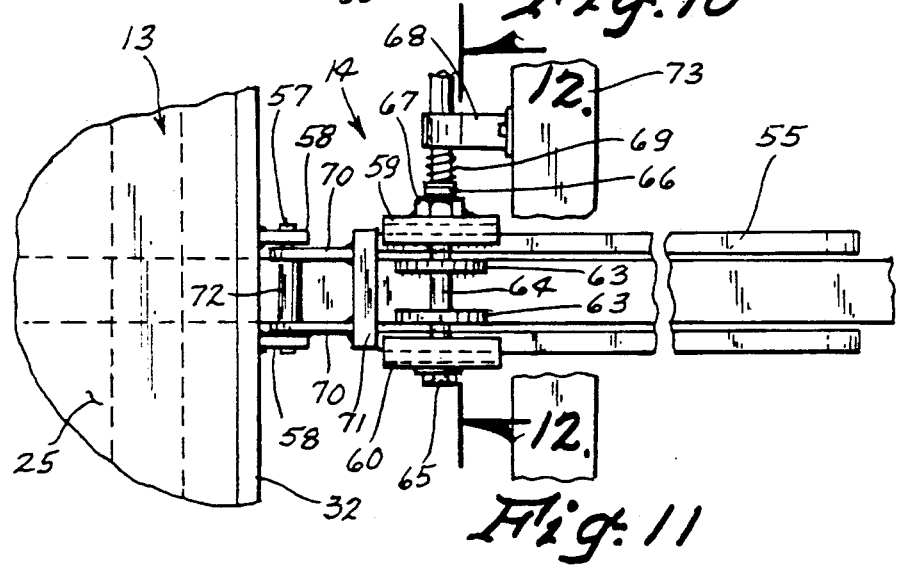
FIG. 11 is a view taken along line 11—11 of FIG. 10.
Figure 12:
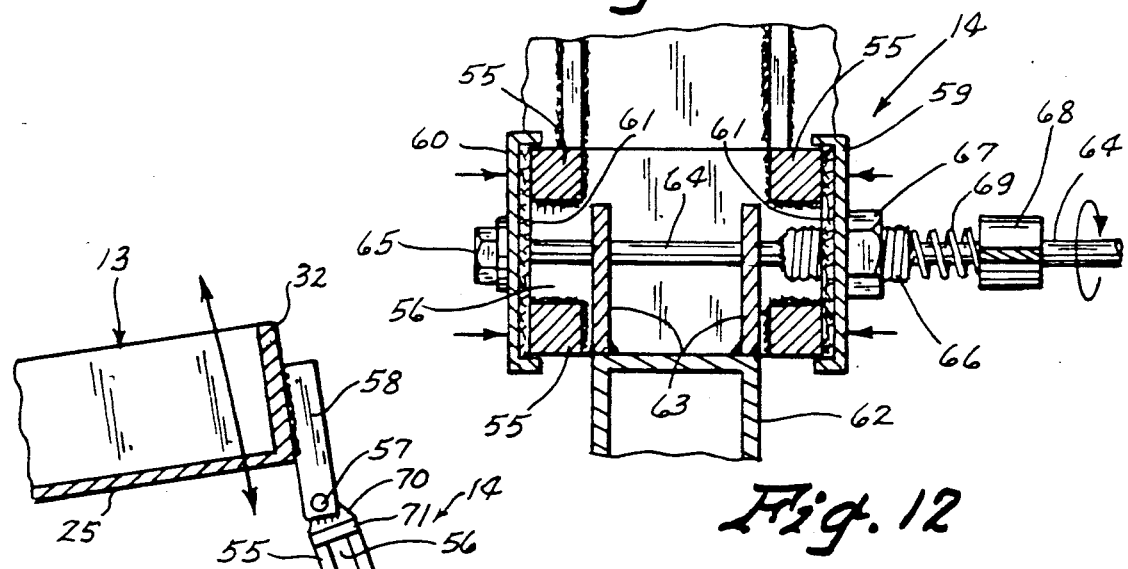
FIG. 12 is an enlarged partial cross sectional view taken along line 12—12 of FIG. 11 to show how the brake can be adjusted.
Figure 13:
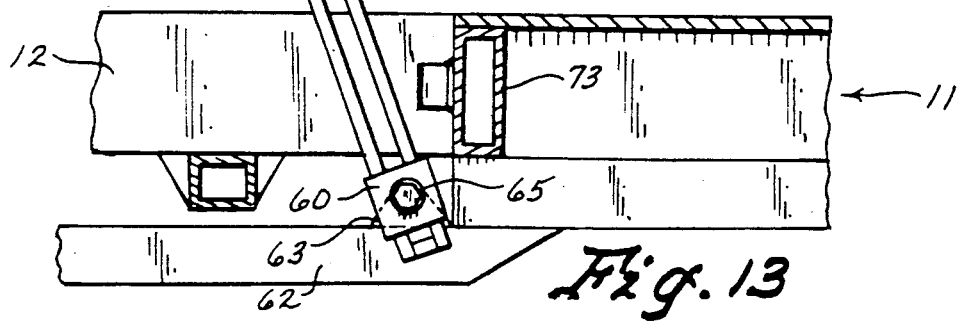
FIG. 13 is an enlarged view of the brake mechanism similar to that shown in FIG. 5 when the tilting bed is completely tilted up.

The adjustable brake mechanism (14) is shown in more detail in FIGS. 10-13 and includes an arm (55) having a central slot (56) disposed therein. The arm (55) is pivotally attached by pin (57) to a bracket (58) welded to the front edge of the tilting bed (13). Referring to FIGS. 12 and 13, it is noted that backing plates (59) and (60) have brake pads (61) attached at the inner portion thereof and that these plates (59), (60) and brake pad (61) are pivotally attached to the perimeter frame member (62) by flanges (63), as is shown in FIG. 12. A rod (64) extends through openings in the flanges (63) to thereby pivotally attach the backing plates and brake pads (59-61) to the perimeter frame (11). One end of the rod (64) has a bolt-like hexhead (65) thereon and the other end of the rod (64) has a threaded portion (66) thereon which threadably engages an internally threaded nut (67) which is welded to the backing plate (59). Rod (67) is rigidly attached to the threaded portion (66), such as by welding, and an optional catch member (68) is biased by a spring (69) around the rod (67) for optionally locking the rod (67) against rotation when it is desired to keep the adjustable brake in one particular tightness condition thereof.

Flanges (70), as shown in FIG. 11, are welded to a member (71) which is, in turn, welded to the slotted arms (55). These flanges (70) are pivotally attached to the brackets (58) by the pin (57) which also extends through openings in the brackets (58), flanges (70) and through a spacer (72). The guide (68) is shown bolted to a structural member (73) on the perimeter frame (11).

Figure 4:
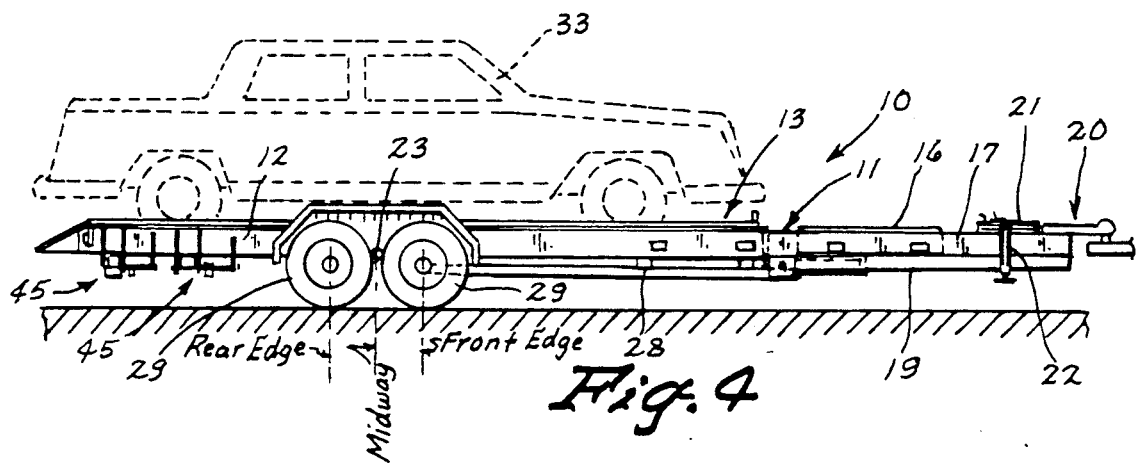
FIG. 4 is a side elevational view of the trailer shown in FIG. 1 and having an automobile shown in dashed lines loaded thereon in the substantially horizontal transport position of the tilting bed.
Figure 5:
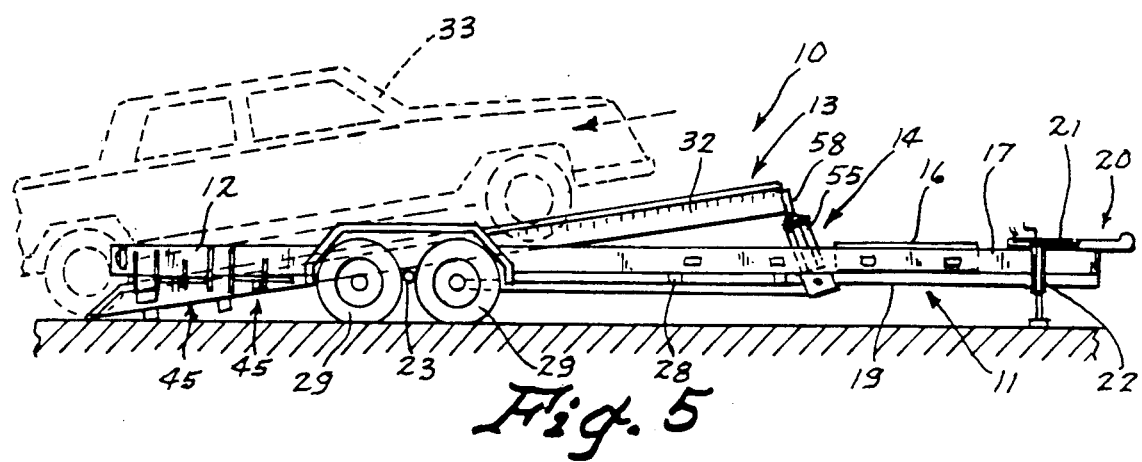
FIG. 5 is a view like FIG. 4 but showing the tilting bed in a tilted loading position or unloading position and the automobile, in dashed lines, being unloaded therefrom.
Figure 10:
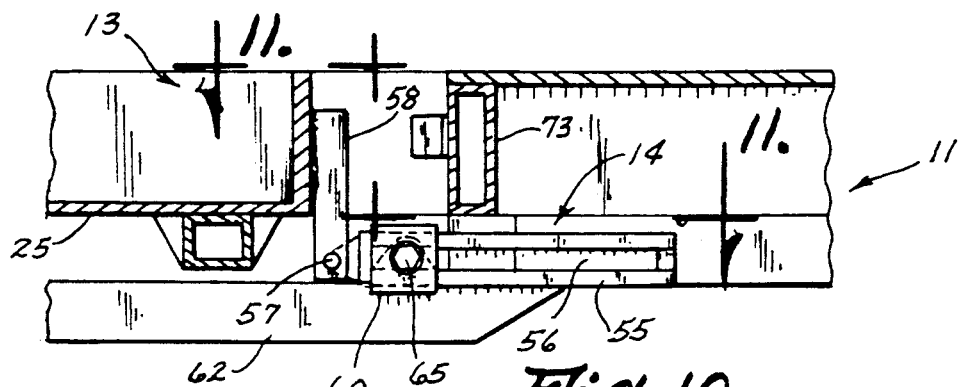
FIG. 10 is an enlarged partial cross sectional view taken along line 10—10 of FIG. 3 and showing how the adjustable brake is attached to the perimeter frame and to the tilting bed.

The operation of the trailer (10) shown in FIGS. 1-13 is such that when an automobile (33) or the like as shown in FIG. 5 is desired to be loaded thereon, the locking mechanisms (45) shown in FIGS. 4, 5 and 6 can be released by moving the rods (37) from the position shown in solid lines in FIG. 7 to the position shown in dashed lines in FIG. 7, which also corresponds to the position shown in solid lines in FIG. 6. The tilting bed (13) then can be tipped to the position shown in FIG. 5 whereupon an automobile (33) or the like, as shown in dashed lines in FIG. 5, can be driven, winched or pushed up onto the tilting bed (13).

If the adjustable brake (14) in FIGS. 2 and 10-13 is properly adjusted by rotating the rod (67) in one rotary direction to pull the backing plates (59) and (60) closer together to tighten the brake pad (61) against the slotted arm (55) or rotated in a opposite direction to loosen the force of the brake pad (61) against the slotted arm (65), then a proper cushioning of the tipping action will occur. Once the center of gravity of the automobile (33), shown in FIG. 5, moves in front of the shaft (23), shown in FIGS. 4 and 5, the tilting bed (13) will begin to tip down from the position shown in FIG. 5 to the position shown in FIG. 4. If the brake (14) was not present, the tilting bed (13) would slam down and could damage the trailer (10) or the automobile (33). But with the brake (14) properly adjusted, as referred to above, this will be prevented. When the automobile (33) is in the position shown in FIG. 4, the locking mechanisms (45) will be utilized by moving the rods (37) from the position shown in FIG. 6 to the position shown in FIG. 7. When this is done, the tab (39) will fall down into slot (40) to prevent the locking mechanisms (45) to become unlocked before it is done intentionally again.

Of course when it is desired to unload the vehicle (33), the locking mechanisms (45) need to be moved back from the position shown in FIG. 7 to the position shown in FIG. 6. When the automobile is backed up, the bed (13) will tip down to the position shown in FIG. 5, the tipping being cushioned by brake (14).

Quite often, if the weight on the rear end of the tilting bed (13) is more than the weight on the front end of the tilting bed (13), the beams (50) will be biased upwardly against the rods (37) thereby making it difficult to unlock the locking pins (37). If this occurs, then a pry bar (54), as shown in FIG. 8, can be inserted in the openings (53). Then the beams (50) can be pried upwardly by resting the lower portion of the pry bar (54) on the top of the U-shaped member (42) during the prying process.

FIG. 14 shows an alternate embodiment (110) of the invention which is just like embodiment (10) except that it is longer and has three pairs of wheels, each pair of wheels having an axle which extends through a separate axle housing welded to the perimeter frame thereof. It is also important to note that the trailer (10) could have just one set of wheels. That would mean that only one axle housing (27) would be welded to the structural members (12) of the perimeter frame (11) and that would also mean that the rod (23) would be immediately above the axis of rotation of the axle and wheels of such embodiment. This is important because all of the weight of everything on the tilting bed (13) is transferred to the perimeter frame (11) in such a way that the perimeter frame itself will not tend to tip up or down at either end during the loading process.

The rod (23), shown in FIG. 2, needs to be above the axle housings (27) in the embodiment of FIG. 2 so that the axle housings (27) will not interfere with the tipping action of the tilting bed (13).

Accordingly, it will be appreciated that the preferred embodiment shown herein do indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A trailer apparatus comprising:
   a perimeter frame, including a front, rear and intermediate portion thereof;
   hitch means attached to the front of said perimeter frame for permitting attachment to a towing vehicle;
   wheel means having at least one rotational axis attached to the intermediate portion of said perimeter frame for holding said perimeter frame up off the ground, said wheel means having a front edge and a rear edge where said wheel means contacts the ground;
   a tilting bed disposed inside of said perimeter frame, said tilting bed having a front end and a rear end;
   pivot means attached to said perimeter frame and said tilting bed for permitting said tilting bed to tilt about a fixed horizontal axis between a substantially horizontal transport position and a tilted loading position, said horizontal axis being located substantially midway between said front and rear edges and above said at least one rotational axis, whereby as cargo is loaded onto said tilting bed from the rear end toward the front end when the tilting bed is in said tilted loading position, said tilting bed will tilt from the tilted loading position to the substantially horizontal transport position approximately when the center of gravity of said cargo passes forward of said horizontal transport position approximately when the center of gravity of said cargo passes forward of said horizontal axis; and,
   capturing means disposed on the rear of said perimeter frame for engaging said tilting bed and bearing the weight of the rear end of said tilting bed when the tilting bed is in the horizontal transport position.

2. The trailer apparatus of claim 1 including:
   brake means attached to said perimeter frame and to the front of said tilting bed for slowing down the speed of tilting of said tilting bed when said tilting bed moves from said tilted loading position to said substantially horizontal transport position.

3. The trailer apparatus of claim 2 including means for adjusting the speed of braking of said braking means.

4. The trailer apparatus of claim 3 wherein said braking means comprises:
   an arm pivotally attached to the front of said tilting bed;
   a slot disposed in said arm;
   a threaded member operatively attached to said perimeter frame;
   a first brake pad disposed on one side of said arm;
   a second brake pad disposed on the other side of said arm; and
   means for causing said first and second brake pads to move toward said arm when said threaded member is rotated in one rotational direction to tighten the braking force thereon and move said first and second brake pads apart when said threaded rod is rotated in an opposite rotational direction to loosen the braking force.

5. The trailer apparatus of claim 4 wherein said threaded member extends through said slot.

6. The trailer apparatus of claim 5 including a first metal backing plate for said first brake pad and a second metal backing plate for said second brake pad, said threaded rod extending through both of said backing plates and through both of said brake pads.

7. The trailer apparatus of claim 1 wherein said capturing means includes a locking member selectively slidable between a first position holding said tilting bed up into said substantially horizontal transport position and a second position allowing said tilting bed to tilt down to said tilted loading position.

8. The trailer apparatus of claim 7 including means for prying said tilting bed up to relieve the pressure of said tilting bed on said locking member whereby said locking member can easily slide between said two positions thereof.

9. The trailer apparatus of claim 1 including:
a beam attached to the rear of said tilting bed and extending under said perimeter frame;
a pair of downwardly depending flanges rigidly attached at the top thereof to said perimeter frame;
a pair of aligned holes in said flanges;
a rod selectively disposed in said aligned holes to hold said tilting bed in said substantially horizontal transport position and movable out of said aligned holes to permit said tilting bed to tilt;
a prying rest rigidly attached to the lower ends of said pair of flanges; and
means for permitting said beam to be pried upwardly when said tilting bed is in the substantially horizontal transport position by resting a pry bar over said prying rest and against said beam, whereby said beam will be moved up to allow said rod to be easily removed.

* * * * *